United States Patent [19]

Werhli

[11] 3,947,356

[45] Mar. 30, 1976

[54] ARRANGEMENT FOR REGULATING THE MOISTENING SOLUTION MIXTURE IN A MOISTENING SOLUTION PREPARATION PLANT FOR AN OFFSET PRINTING PRESS

[75] Inventor: Alfons Werhli, Bern, Switzerland

[73] Assignee: Maschinenfabrik Wifag, Bern, Switzerland

[22] Filed: May 21, 1975

[21] Appl. No.: 579,688

Related U.S. Application Data

[63] Continuation-in-part of Ser. No. 515,817, Oct. 18, 1974, abandoned, which is a continuation of Ser. No. 416,743, Nov. 19, 1973, abandoned.

[30] Foreign Application Priority Data

Nov. 20, 1972 Sweden .......................... 15084/72

[52] U.S. Cl. ................ 210/96 R; 101/147; 137/93; 210/101; 210/105; 210/195 S; 210/205; 210/287

[51] Int. Cl.$^2$ ........................................ B01D 23/26

[58] Field of Search .......... 101/147, 148; 137/5, 88, 137/93; 210/87, 96, 101, 105, 143, 192, 195, 205, 259, 287

[56] References Cited

UNITED STATES PATENTS

| | | | |
|---|---|---|---|
| 2,377,363 | 6/1945 | Noble et al. | 210/143 X |
| 3,485,257 | 12/1969 | Gegenheimer et al. | 101/147 X |
| 3,557,817 | 1/1971 | Royse | 101/148 X |
| 3,761,953 | 9/1973 | Helgeson et al. | 137/5 X |

*Primary Examiner*—Charles N. Hart
*Assistant Examiner*—Robert G. Mukai
*Attorney, Agent, or Firm*—Toren, McGeady and Stanger

[57] ABSTRACT

In an arrangement for regulating the moistening solution mixture for use in an offset printing press, a tank is provided with two separate spaces, one for the moistening solution mixture and the other for a moistening solution additive. A conduit system containing various regulating devices is connected to the tank for regulating the introduction of the additives into the mixture and for the supply of the solution to the printing unit, a crystal sand filter is located in the conduit system for filtering the mixture and a pump, associated with the filter, directs a part of the filter mixture to the printing unit and returns a part of the mixture to the tank. A flow measuring electrode is arranged in the conduit system and is operatively connected to the regulating devices for controlling operation of the arrangement.

1 Claim, 3 Drawing Figures

ARRANGEMENT FOR REGULATING THE MOISTENING SOLUTION MIXTURE IN A MOISTENING SOLUTION PREPARATION PLANT FOR AN OFFSET PRINTING PRESS

CROSS-REFERENCE TO RELATED APPLICATIONS

This is a continuation-in-part application of prior application Ser. No. 515,817 filed on Oct. 18, 1974, now abandoned, which was a continuation of application Ser. No. 416,743 filed Nov. 19, 1973, now abandoned.

SUMMARY OF THE INVENTION

The present invention is directed to a moistening solution preparation plant for an offset printing press and, more particularly, it is directed to an arrangement for regulating the operation of the moistening solution preparation plant and the supply of the solution to the printing unit.

There is a known arrangement for feeding a moistening solution which contains a tank and a dosing device for the etching solution, a chamber for mixing the etching solution with water, and a moistening solution container and these receptacles are connected with one another by a controllable line or conduit system. The dosing device is formed as a dosing vessel with a mechanism for setting the amount of etching solution to be discharged and a liquid gauge regulator is arranged in the mixing chamber which, by means of magnet valves controls the supply of the etching solution from the dosing vessel and the supply of water to the mixing chamber by a water jet pump with the pump delivering the moistening solution from the mixing chamber into the moistening solution container of the plate cylinder.

This arrangement has a complicated and expensive conduit system including several pumps which require considerably cleaning. For large plants, the arrangement is not sufficiently effective and many manual corrections are necessary. Sometimes, the pH value of the moisteining solution used in the printing plant is changed by the paper and it is not possible to compensate for such a change by more or less etching solution.

The primary object of the invention is to provide an arrangement which makes it possible to pre-set the desired pH and alcohol values and to ensure an automatic flow control with the recordation of the control, and, during operation, a constant regulation on the set values being used.

The problems experienced in the prior art are solved by the present invention with the use of a crystal sand filter and a circulating pump located in the conduit system through which the moistening solution mixture is filtered with a portion fed to the printing unit, while another part is returned to the moistening solution tank. Further, the regulation of the plant is obtained by a flow measuring electrode, a line recorder, an acid regulator, an alcohol regulator, a differential pressure transmitter, a pH-meter and switches which are arranged in the conduit system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descripitive matter in which there is illustrated and described a preferred embodiment of the invention.

DETAILED DESCRIPTION OF THE INVENTION

Figure 1:
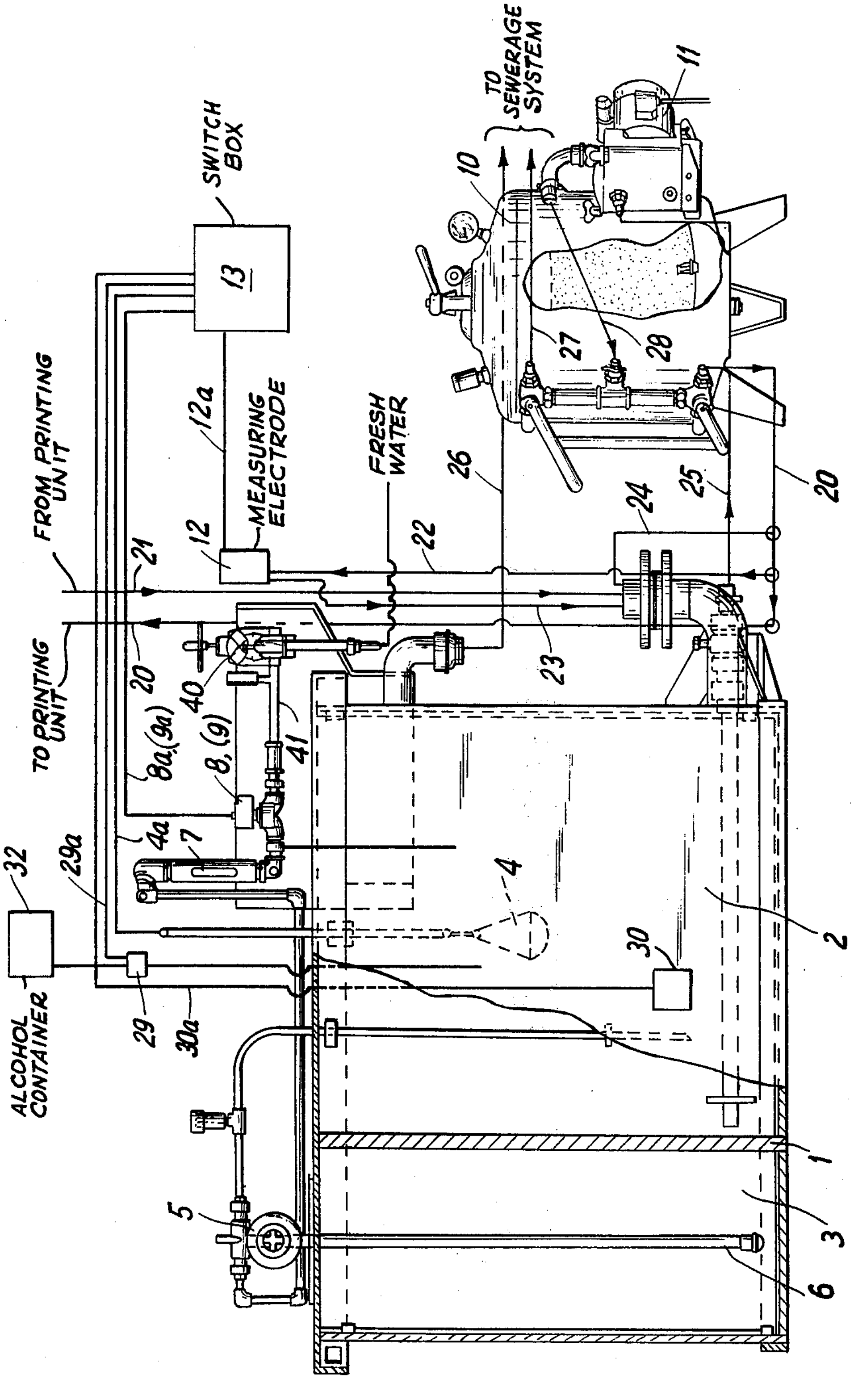
FIG. 1 is a side elevational view with two parts broken away, embodying the present invention.
Figure 2:
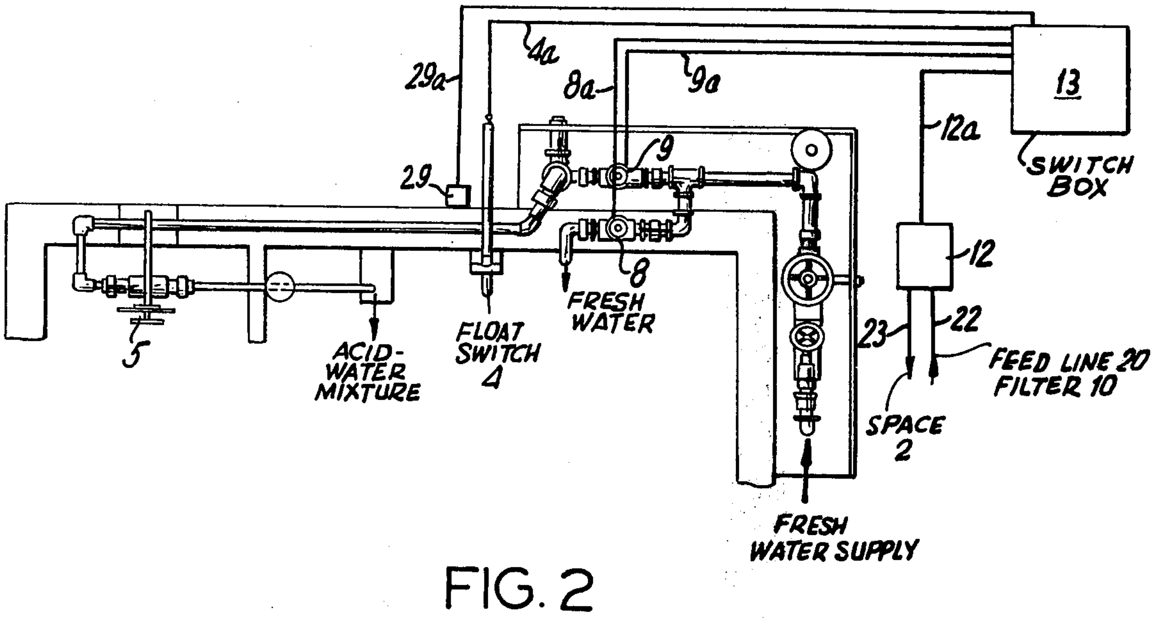
FIG. 2 is a partial top view of the arrangement shown in FIG. 1.

In FIG. 1, an arrangement is illustrated for use in a printing press for supplying a moistening solution mixture to the printing unit, not shown, which includes a tank 1 divided by a partition into two vessels 2,3 with one space 2 containing the moistening solution mixture and the other space 3 holding a moistening solution additive. Extending downwardly into the moistening solution mixture space 2 is a float switch 4 and, above the moistening solution additive space 3, an injector 5 is positioned to which a suction pipe 6 is connected and extends downwardly into the space 3. The injector 5 and suction pipe 6 are connected to a conduit system which contains a flow detector 7, solenoid valves 8 and 9, a crystal sand filter 10 and a circulating pump 11. Moistening solution mixture flows through the conduit system into the crystal sand filter 10 where it is filtered and by means of the pump 11, is fed in part to the printing unit, with another part returning into the moistening solution mixture space 2. Further, in the conduit system between the tank 1 and the filter 10, a pH flow measuring electrode 12 is provided which is connected to switch box 13.

Figure 3:
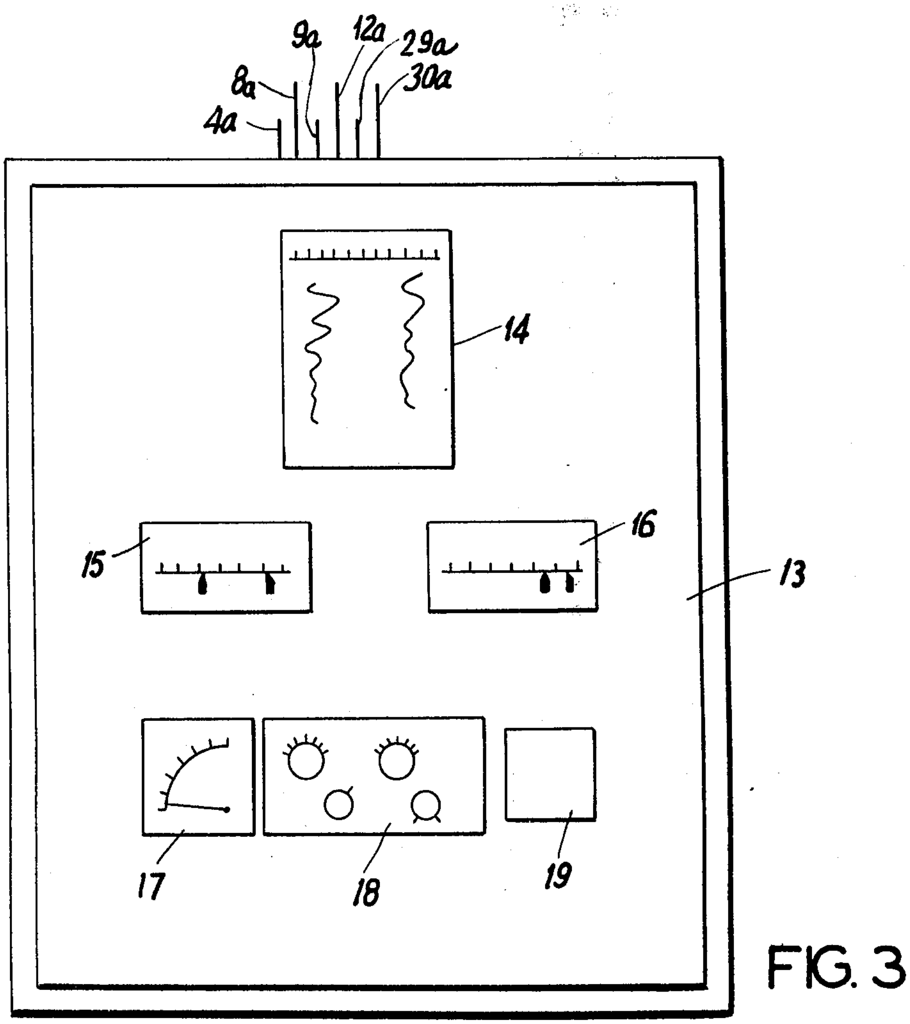
FIG. 3 is an elevational view of a switch box containing the instrumentation used in the arrangement.

The switch box 13 is connected by way of separate electrical lines **4*a*, 8*a*, 9*a*, 12*a* and 29*a* to the float switch 4, to the solenoid valves 8 and 9, to the measuring electrode 12 and to a solenoid or alcohol flow valve 29. As illustrated in FIG. 3, the switch box 13 contains a line recorder 14, an acid regulator 15, an alcohol regulator 16, a differential pressure transmitter 17, a pH-meter 18, as well as operating switches 19. The electrical lines 4*a*, 8*a*, 9*a*, 12*a* and 29*a* are connected to related ones of the devices in the switch box 13.**

In the conduit system, a feed line 20 extends from the filter 10 to the printing unit (not shown) and a return line 21 conveys flow from the printing unit to the space 2 in the tank 1. A branch line 22 connects the feed line 20 to the measuring electrode 12 and another line 23 extends from the electrode to the space 2 in tank 1. A second branch line 24 from feed line 20 connects it to the space 2 in tank 1 and a built-in pressure regulator (not shown) is located in the second branch line.

The space 2 in the tank 1 is connected to the filter 10 via the line 25, the pump 11 and connecting line 28. Outlet line 26 connects the space 2 to a sewerage system (not shown). The filter 10 is connected to the sewerage system (not shown) by another outlet line 27.

For measuring the alcohol percentage, a special device 30 is used which is shown only schematically and is connected by electrical line **30*a* to the switch box 13. It consists of a diaphragm pump, two dosing mechanisms, and a measuring transformer which are connected to the alcohol regulator 16 and differential pressure transmitter 17. Alcohol is supplied from a container 32 through solenoid or alcohol flow valve 29 into the space 2 based on the signal provided by the device 30 and in accordance with the control afforded by the regulator 16 and the differential pressure transmitter 17**.

The arrangement embodying the present invention operates in the following manner:

Moistening solution mixture flows from the filters 10 to the printing unit by way of the feed line 20. A partial flow of the mixture passes from feed line 20 through branch line 22 into the pH flow measuring electrode 12. The acid content of the moistening solution mixture is measured in the electrode 12 and the measuring current is passed to the acid regulator 15 in the switch box 13 where an indication of the value is provided. Further, the value measured is recorded in the line recorder 14, which is connected to the regulator 15, and the tape in the recorder can be used for control purposes in case of irregularities.

Based on the indication of the acid content provided by the electrode 12 over line 12*a* to the switch box 13. The regulator 15 opens the solenoid valve 8 when the acid content in the space 2 is too high, so that pure fresh water flows into the space 2. If, however, the acid content is too low, the other solenoid valve 9 is opened and fresh water flows through the injector 5 suctioning acid through pipe 6 from space 3 of tank 1 and delivering the water-acid mixture into space 2.

Within the sapce 2 in the tank 1, the float switch 4, electrically connected to the switch 13, also monitors control. When the level in the space 2 drops, the float switch initiates the control operation. Over electrical line 4*a* it signals the regulator 15. Water is introduced directly through a supply valve 40 into a line 41 of the conduit system from a fresh water connection so that it can flow selectively through one of the valves 8, 9. If the fresh water is directed through valve 9, it causes a suction action as it passes through the injector 5 and the acid is sucked into the space 2 from the space 3 by means of the injector 5 and suction pipe 6, and, as a result, acid along with water is supplied from the space 3 into the moistening solution mixture in the space 2. If the valve 8 is opened by regulator 15 only fresh water enters the space 2.

An even finer regulation of the addition of water and acid can be provided with a reversing switch which has three settings: water, normal flow, and acid. In this way, it is possible to maintain a practically unchanged pH value as operation continues.

The alcohol percentage is measured by means of the special device 30 mentioned above and the differential pressure transmitter 17. The alcohol percentage reading is supplied to the alcohol regulator 16, which controls the alcohol flow valve 29. The alcohol values are also recorded in the line recorder 14 and a permanent record is provided on its tape. The alcohol flow valve remains open until the set value has been attained.

While a specific embodiment of the invention has been shown and described in detail to illustrate the application of the inventive principles, it will be understood that the invention may be embodied otherwise without departing from such principles.

What is claimed is:

1. Arrangement for regulating the moistening solution mixture in a moistening solution preparation plant for use in an offset printing press comprising a tank having two separate spaces with one space containing a moistening solution mixture and the other space containing a moistening solution additive, a float switch positioned within the moistening solution mixture space, an injector above the moistening solution additive space, a suction pipe connected to the injector and extending downwardly into the space containing the moistening solution additive, a conduit system connected to said injector and suction pipe and including a line extending from said injector into said moistening solution mixture space, a flow detector in said conduit system and connected to said injector, a first solenoid valve connected to said flow detector, a second solenoid valve connected to said moistening solution mixture space, wherein the improvement comprises that a crystal sand filter and a circulating pump associated with said filter are located in said conduit system for filtering the moistening solution mixture from said moistening solution mixture space for feeding a portion of the filtered mixture to the printing press and for returning a portion into the moistening solution mixture space in said tank, a pH measuring electrode in said conduit system, a switch box, a first electrical line connecting said pH measuring electrode to said switch box, a second electrical line connecting said float switch to said switch box, a third electrical line connecting said first solenoid valve to said switch box, a fourth electrical line connecting said second solenoid valve to said switch box, said switch box including a line recorder, an acid content regulator a pH-meter and switches arranged to regulate the moistening solution mixture, said conduit system further comprising a first line connecting said mixture space to said filter through said pump, a feed line for flowing the moistening solution from said filter to the printing press, a first branch line connecting said feed line to said measuring electrode, a second branch line connecting said feed line to said mixture space, a second line connecting said measuring electrode to said mixture space, a return line for flowing the moistening solution from the printing press to said mixture space, a third line connecting a source of fresh water to said first and second solenoid valves, said solenoid valves being arranged so that one of said solenoid valves can be opened by said switch box by a signal from said measuring electrode while maintaining the other closed thereby selectively admitting the fresh water either directly into said mixture space or through said flow detector to said injector for withdrawing additive from said additive space through said suction pipe for mixture with the fresh water and flow into the mixture space, and said float switch arranged for operating at least one of said solenoid valves when the level in said mixture space drops below a selected level for adding make-up into said mixture space.

* * * * *